May 23, 1950  R. P. McNERNEY  2,508,961
FAST ACTING STOP SIGNAL
Filed March 28, 1949
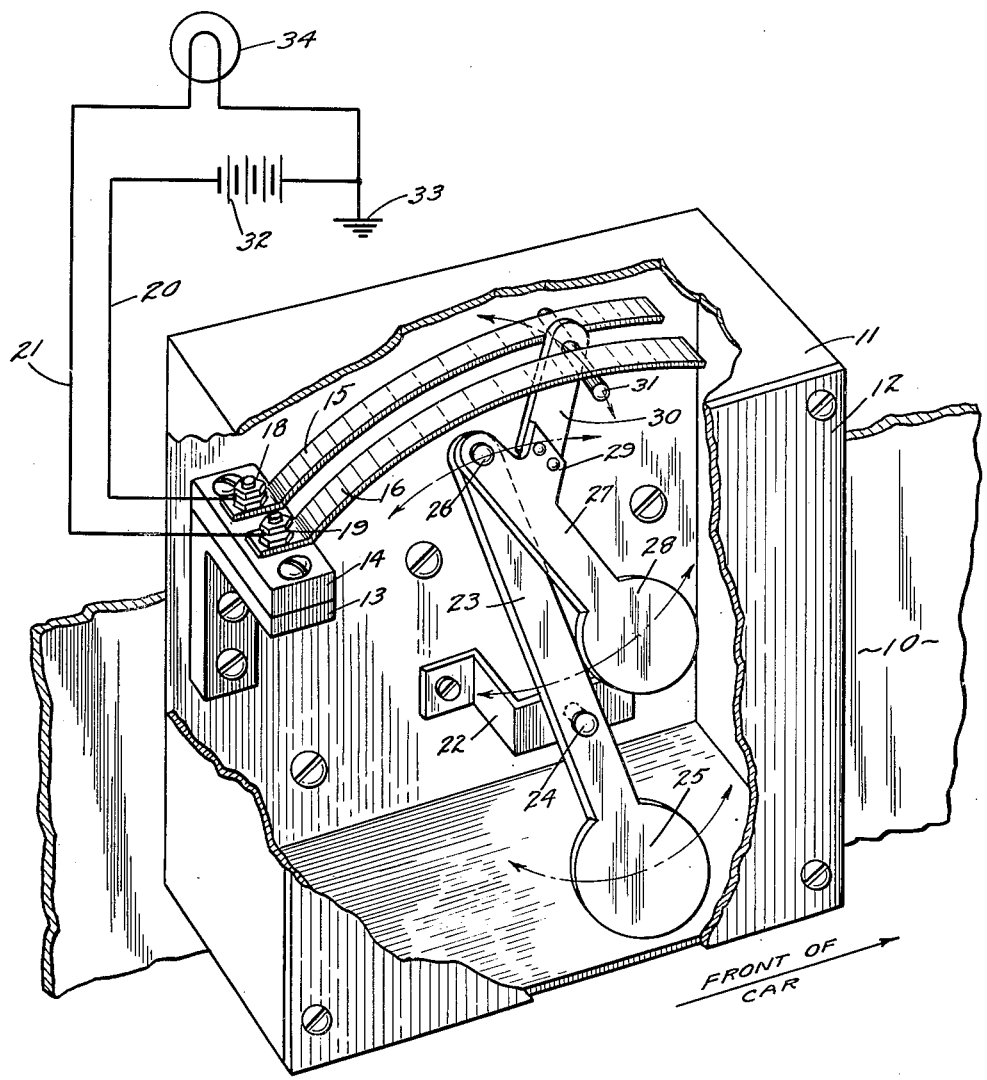
INVENTOR.
Robert P. McNerney
BY W. B. Harpman
ATTORNEY.

Patented May 23, 1950

2,508,961

UNITED STATES PATENT OFFICE 2,508,961

FAST ACTING STOP SIGNAL

Robert P. McNerney, Sharpsville, Pa., assignor of one-half to Charles J. Songer, Farrell, Pa.

Application March 28, 1949, Serial No. 83,933

3 Claims. (Cl. 200—52)

This invention relates to stop signals and more particularly to stop signals actuated by deceleration by a vehicle on which they are positioned.

The principal object of the invention is the provision of a fast acting deceleration signal.

A further object of the invention is the provision of a simple and inexpensive fast acting deceleration signal.

A still further object of the invention is the provision of a fast acting deceleration signal for vehicles incorporating dual actuating members for multiplying the rate of actuation of the signal.

It is well known that many accidents occur involving motor vehicles due to the lack of knowledge of the driver of a motor vehicle that the motor vehicle ahead of him is slowing down or stopping. Stop signals as known in the art relate to those actuated by the actual engagement of the brakes of the vehicle and no means is provided on most vehicles for indicating intention of slowing down or the fact that the accelerator has been released and the operator intends to apply the brakes.

The present invention relates to fast acting deceleration signals applicable to motor vehicles and utilizing the inertia in parts of the signal for imparting actuating movement to the circuit controlling parts of the signal whereby a circuit may be closed and a signal given immediately when the vehicle begins to decelerate.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein the figure is a perspective view of the deceleration signal with parts broken away and parts in cross section and incorporating a symbolic wiring diagram.

By referring to the drawing and the figure thereof it will be seen that a longitudinally extending portion of a motor vehicle is indicated by the numeral 10 and may comprise a portion of the vehicle frame or body and has secured thereto an enclosing box 11 including a removable cover 12 in which the apparatus of the deceleration signal is located. The apparatus comprises an L-shaped bracket 13 carrying an insulator block 14 which in turn has a pair of spaced outwardly extending arched contact strips 15 and 16, respectively. Terminal connectors 18 and 19 provide means for connecting electrical circuit wires to the contact strips 15 and 16 and such circuit wires are indicated symbolically in the figure of the drawings by the numerals 20 and 21, respectively. The enclosing box 11 has a U-shaped bracket 22 located therein beneath the outwardly extending arched contact strips 15 and 16 and has a pendulum arm 23 pivoted thereto as by a pivot 24. The pendulum arm 23 has a pendulum end section 25 on its lowermost end and a pivot 26 on its uppermost end and a secondary pendulum arm 27 is pivoted to the pivot 26.

The secondary pendulum arm has a pendulum weight 28 on its lowermost end and a sidewardly and upwardly projecting member 29 is located on the secondary pendulum arm 27 adjacent the pivot 26. The sidewardly projecting member 29 has an insulating end section 30 which carries a transversely positioned contact pin 31. The contact pin 31 is of a length sufficient to bridge the contact strips 15 and 16 heretofore referred to. It will be observed that the insulating end section 30 of the projecting member 29 is positioned for longitudinal travel between the contact strips 15 and 16 responsive to the action of the pendulum arm 23 and pendulum weight 25 thereof.

The electrical circuit wire 20 connects with a battery 32, the other side of which is grounded as at 33 to the car frame and the wire 21 connects with an incandescent bulb 34, the other side of which is grounded as at 33 to the car frame. It will thus be seen that the contact pin 31 will, upon contacting the contact strips 15 and 16, close an electrical circuit between the battery 32 and the incandescent bulb 34 with the result that the bulb may be illuminated.

Operation

The fast acting deceleration signal in operation responds to the deceleration of the vehicle rapidly and efficiently, it being observed that the right hand portion of the signal is closest the front of the vehicle on which the signal is positioned and under such conditions any deceleration of the vehicle will result in the pendulum weights 25 and 28 swinging from left to right, which action will multiply the rate of deceleration with respect to the movement of the contact pin 31 as the pendulum arm 23 will move the pivot 26 to the left, as shown in the figure of the drawings, responsive to the motion of the pendulum weight 25 thereon to the right which action will tend to move the pivot 26 away from the secondary pendulum arm 27 which is also responding to the movement of its pendulum weight 28 from left to right. The net result of the combination of movements is to multiply the rate of swinging of the secondary pendulum arm 27, and more particularly the extension 29, and insulating end section 30 thereof which carries the contact pin 31. Such action will immediately move the contact pin 31 upwardly into engagement with the contact strips 15 and 16 and result in the immediate illumination of the incandescent bulb 34.

It will thus be seen that the fast acting stop signal meets the several objects of the invention and provides a simple and efficient, extremely fast acting deceleration signal for a motor vehicle.

Having thus described my invention, what I claim is:

1. A deceleration signal comprising a device having a pair of spaced substantially horizontal contact strips and means for closing a circuit therebetween, said means comprising a pair of weighted pendulum arms beneath said contact strips, one of said pendulum arms being pivoted to the motor vehicle and the other of which is pivoted to the first mentioned pendulum arm at a point on the opposite side of the pivot with respect to the pendulum weight of the first mentioned pendulum arm, the last mentioned pendulum arm carrying a sidewardly and upwardly extending contact member for engagement with the said contact strips thereabove when moved substantially vertically.

2. Means for closing an electrical circuit and comprising a pendulum arm pivoted inwardly from its ends and having a pendulum weight on its lower end and a pivot pin on its upper end, and a secondary pendulum arm pivoted to said pivot pin, a pendulum weight on the lower end of the said secondary pendulum arm and an upward extension on the said secondary pendulum arm, a transverse contact member on the said extension, contact strips positioned horizontally and on an arc conforming with a radius based on the pivot point of the said pendulum arm and normally lying immediately above the said contact member whereby movement of the pendulum weights in one direction will move the contact member upwardly into engagement with the said contact strips to close a circuit therebetween.

3. A fast acting stop signal for motor vehicles comprising a support means, a pair of contact strips secured to said support means and insulated therefrom and extending outwardly therefrom substantially horizontally and in an arc and in spaced relation to one another, and means for closing an electrical circuit between the said contact strips, said means comprising a pendulum arm pivoted to said support means inwardly from its ends and having a secondary pivot at its uppermost end, a secondary pendulum arm pivoted to the said secondary pivot and a sidewardly and upwardly extending member on said secondary pendulum arm having a transverse contact pin and insulated from said secondary pendulum arm, the first mentioned pivot positioned with respect to the said contact strips so that the said secondary pivot follows an arc adjacent thereto when the said pendulum arm moves and the secondary pendulum arm elevates the said contact pin when it moves.

ROBERT P. McNERNEY.

REFERENCES CITED

The following references are of record in the file of this patent:

UNITED STATES PATENTS

| Number | Name | Date |
|---|---|---|
| 1,720,395 | George | July 9, 1929 |
| 1,805,147 | Murray | May 12, 1931 |
| 2,199,122 | White | Apr. 30, 1940 |
| 2,420,351 | Brown | May 13, 1947 |
| 2,448,181 | Holm | Aug. 31, 1948 |